United States Patent [19]

Wortham

[11] Patent Number: 4,475,301
[45] Date of Patent: Oct. 9, 1984

[54] FISH ATTRACTING DEVICE

[76] Inventor: Charles D. Wortham, Rte. 1, Box 429, Shongaloo, La. 71072

[21] Appl. No.: 397,433

[22] Filed: Jul. 12, 1982

[51] Int. Cl.³ .................... A01K 75/02; A01K 97/04
[52] U.S. Cl. ........................................ 43/17.5; 43/41
[58] Field of Search ............... 43/17.5, 41, 54.1, 56, 43/44.99, 4.5

[56] References Cited

U.S. PATENT DOCUMENTS

| | | | |
|---|---|---|---|
| 3,079,721 | 3/1963 | Smith | 43/17.5 |
| 3,091,882 | 6/1963 | Dudley | 43/17.5 |
| 3,177,604 | 4/1965 | Ewing | 43/41 |
| 3,510,978 | 5/1970 | Murdock | 43/41 |
| 3,693,278 | 9/1972 | Mahone | 43/17.5 |

FOREIGN PATENT DOCUMENTS

| | | | |
|---|---|---|---|
| 29431 | of 1905 | United Kingdom | 43/41 |
| 529824 | 2/1977 | U.S.S.R. | 43/17.5 |

Primary Examiner—Gene P. Crosby

[57] ABSTRACT

A floating fish-attracting device having both submerged and surface fish-attraction features, which device includes an inflated vehicle tire inner tube, an upper and lower disk secured to the inner tube and carrying an elongated bait container support at one end, and a bait container submerged beneath the inner tube and attached to the opposite end of the bait container support. In one embodiment the bait container is provided with multiple holes to facilitate placing minnows and/or other aquatic bait inside the bait container. A first light is provided in a sealed housing above the bait container for illuminating the minnows or other aquatic life in the container and a second housing and light are mounted on the top disk above the surface of the water, along with a system of batteries and switches for controlling illumination of the lights in the upper and lower housings. In a most preferred embodiment of the invention a reflector is positioned on the top light housing to reflect light on an area of water adjacent the inner tube.

10 Claims, 4 Drawing Figures 4,475,301

FISH ATTRACTING DEVICE

BACKGROUND OF THE INVENTION

1. Field of the Invention

Many species of edible fish, both fresh water and salt water varieties, are attracted to smaller, specific varieties of fish and other aquatic life, such as frogs and crawfish, which are preferred as food. Particularly in the case of fresh water fish, the species of Bream, Crappie, Black Bass, and catfish, in non-exclusive particular, generally move into areas where the small fish and aquatic life of choice abound. Accordingly, the fisherman can greatly enhance his ability to take such game fish by fishing in areas frequented by the smaller fish and aquatic life.

This invention relates to devices for attracting fish, and more particularly, to a fish-attracting device which utilizes live bait fish or other aquatic life to attract game fish, and which can be positioned near a dock, beach, bank or boat and allowed to freely float, or float by means of a tether, in the vicinity of the user to attract such fish. The fish-attracting device of this invention is characterized by an inflated vehicle tire inner tube having a top and bottom disk closing the open space in the center of the tube, a downwardly extending elongated bait container support supported by the two disks and a bait container attached to the projecting and submerged end of the support. In a preferred embodiment of the invention the bait container is constructed of a transparent material such as plastic, and is provided with multiple holes to enclose minnows and other aquatic life, such as crawfish and frogs. A sealed, water-tight light housing is provided in cooperation with the submerged bait container in order to illuminate the aquatic life inside the bait container, and a similiar housing is provided on the top disk located above the water line and positioned on top of the top inner tube disk to illuminate the surface of the water in the immediate vicinity of the floating inner tube. In still another preferred embodiment of the invention the top light housing is fitted with a reflector to reflect the light in a desired direction and illuminate a specified area in order to spotlight the fisherman's cork or line when he is fishing near the inner tube. A pair of battery housings containing batteries for self-contained power, and cooperating light switches are also provided on the top disk for independently turning the upper and lower lights on and off, respectively.

2. Description of the Prior Art

Various devices for attracting fish by means of light and/or the use of live bait are known in the prior art. An early patent disclosing such a device is U.S. Pat. No. 777,382, to V. Le Beau, which patent discloses a "Bait Holder and Fish Decoy" consisting of a generally cylindrically-shaped, transparent canister having multiple holes therein and suspended from a cork float, which float is, in turn, attached to a boat or dock. Bait fish are placed inside the canister and the canister is suspended beneath the water to attract fish. Another early fishing lure device is disclosed in U.S. Pat. No. 1,038,866, to J. H. Fuller, et al. This "Fishing Device" includes a generally oblong-shaped, transparent lure having hooks mounted at various locations thereon and a hollow interior and openings to permit water to flow through the body of the device. One or more small bait fish are placed inside the fishing device in order to attract desired game fish. U.S. Pat. No. 3,079,721, to N. J. Smith discloses a "Lure Light", which includes a sealed container having a light bulb and appropriate wiring therein, in cooperation with an attached companion container having slots for the introduction of water. Bait fish are placed inside the companion container, and when the entire device is lowered into the water, the light in the sealed container illuminates the bait fish in the companion container to attract game fish. A similar "Fishing Lure" is disclosed in U.S. Pat. No. 3,177,604, to A. L. Ewing. The fishing lure which is subject of this patent discloses a transparent container provided with bait fish and an accompanying sealed vessel having a light bulb and battery combination to illuminate the bait fish in the container when the apparatus is lowered into the water. Yet another light-and-container combination "Fish-Attracting Device" is disclosed in U.S. Pat. No. 3,510,978, to F. L. Murdock. The device of this patent includes a sealed jar within a transparent container, the jar having a light bulb provided therein, and the container provided with holes to facilitate the placing of bait fish inside the container and the lowering of the entire apparatus in the water to attract game fish.

One of the problems realized in prior art fish attracting devices which are designed to illuminate bait fish located in a transparent container submerged beneath the surface of the water of a lake or stream, is the lack of facility in providing bait-container canisters or vessels of various design to attract various species of fish with the high degree of utility. Another shortcoming is lack of attention to surface lighting, which attracts flying insects and fish which feed on such insects, such lighting also providing a better opportunity of viewing the fisherman's cork or line to determine when the fish which have been lured to the device are taking the users bait.

Accordingly, it is an object of this invention to provide a new and improved fish-attracting device which provides both surface and submerged attraction means, and in a most preferred embodiment, is characterized by a floating vehicle inner tube of selected size; a pair of disks attached to the top and bottom of the tube in order to seal the interior surface of the inner tube; a downwardly-extending bait container support attached to the disks at one end; and a bait container of specified design attached to the opposite end of the support for receiving bait; and separate lighting means for illuminating the submerged bait container and the surface of the water around the inner tube.

Another object of the invention is to provide a new and improved fish-attracting device having both surface and submerged fish-attraction features, which device is characterized by a floating, inflated vehicle tire inner tube containing a submerged bait container and provided with a top light for illuminating the surface area of the water in the general vicinity of the inner tube during night fishing, and a submerged light in cooperation with the bait container for illuminating the bait in the container.

Yet another object of the invention is to provide a new and improved fish-attracting device which is capable of being disposed in the general area of a beach, bank, boat dock or boat and is characterized by an inflated tire inner tube having a pair of disks on the top and bottom thereof to seal the opening in the center of the inner tube, and further provided with an upper light and electrical system positioned on the top disk for illuminating the water immdiately adjacent the inner tube for night fishing, and also including a submerged, transparent bait container carried by the inner tube disks and provided with a sealed lower light and a cooperating electrical system for illuminating bait in the container.

A still further object of the invention is to provide a self-contained, floating fish-attracting device having both surface and submerged fish-attraction features, which device can be deployed near a beach, bank, dock or boat, either in free-floating fashion, or by means of a tether, and which is characterized by an inflated, floating vehicle inner tube provided with top and bottom disks for sealing the center area of the inner tube, and a downwardly projecting, elongated bait container support carried by the disks at one end and supporting a submerged bait container shaped of clear plastic and provided with apertures for containing live aquatic bait, the bait container further provided with a submerged light means for illuminating the bait in the bait container and attracting fish beneath the surface of the water, and a second light means and reflector positioned above the surface of the water on the top disk to attract fish at the surface of the water and spotlight the cork or line of a fisherman.

SUMMARY OF THE INVENTION

These and other objects of the invention are provided in a self-contained, floating fish-attracting device which is characterized by an inflated inner tube of selected size, having a top and bottom disk sealing the middle area of the tube, and a submerged attraction feature consisting of a downwardly projecting, elongated support carried by the disks and attached to a submerged bait container, which in one embodiment is transparent and is provided with apertures for containing live aquatic bait, and in another embodiment is sealed for enclosing insects such as crickets, the bait container further provided with a light means for illuminating the bait and attracting fish, the fish attracting device further including a surface fish-attraction feature consisting of an upper light, a pair of batteries and a pair of switches attached to the top disk and located above the water line, one of the batteries and switches attached to the upper light for illuminating the area immediately around the fish-attracting device, and other battery and switch combination connected to the submerged light.

BRIEF DESCRIPTION OF THE DRAWING

The invention will be better understood by reference to the accompanying drawing, wherein.

DESCRIPTION OF THE PREFERRED EMBODIMENT

Figure 1:
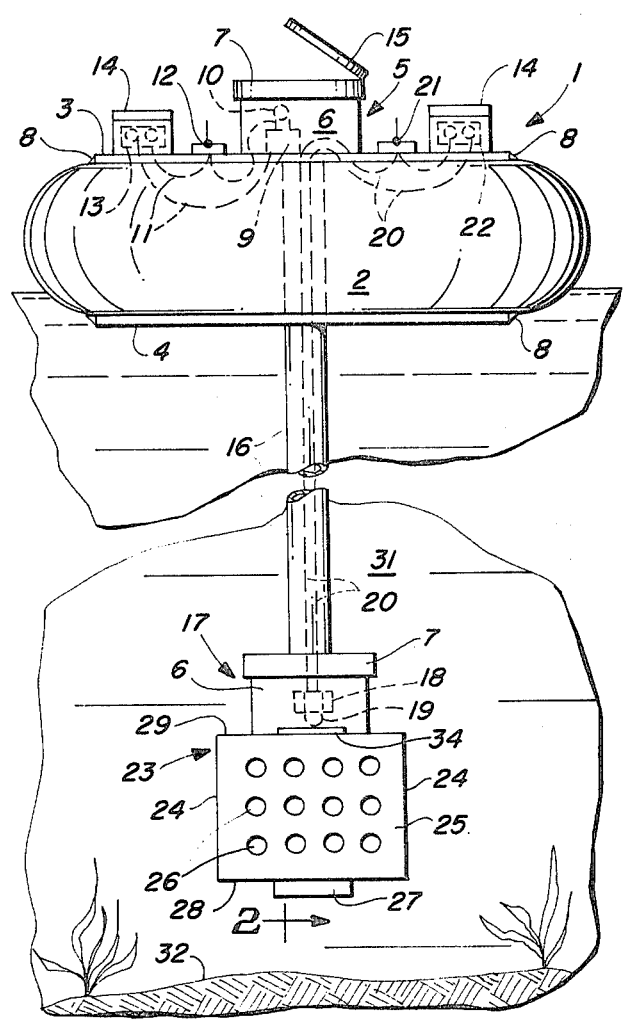
FIG. 1 is a perspective view of a preferred embodiment of the fish-attracting device, in functional position.
Figure 2:
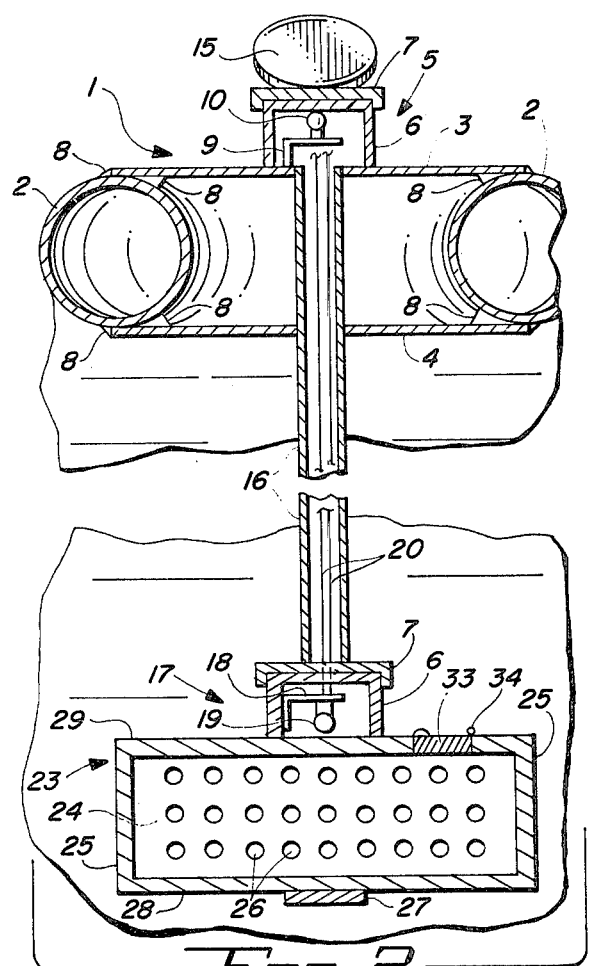
FIG. 2 is a sectional view of the fish-attracting device, taken along lines 2—2 in FIG. 1.
Figure 3:
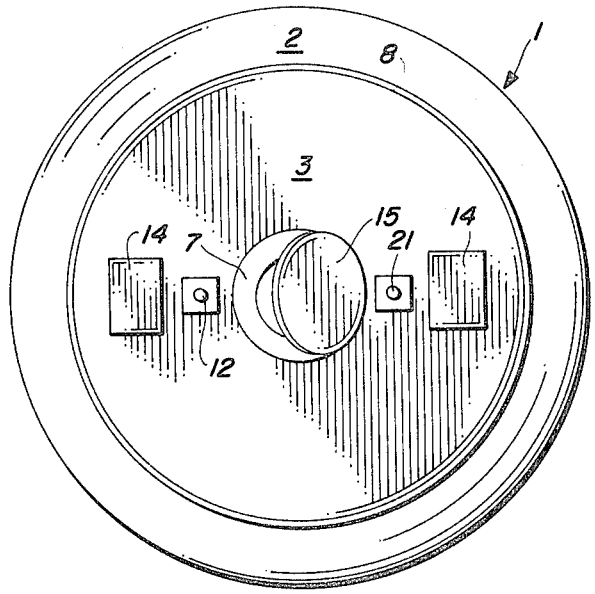
FIG. 3 is a top elevation of the fish attracting device illustrated in FIG. 1.

Referring now to FIGS. 1 and 2 of the drawing the fish-attracting device of this invention is generally illustrated by reference numeral 1 and includes an inflated inner tube 2, provided with a top disk 3 and a bottom disk 4, which seal the open interior of the inner tube 2. In a preferred embodiment of the invention, the top disk 3 and bottom disk 4 are seated and sealed on the inner tube 2 by means of a suitable sealer 8, such as a silicone sealer, to prevent entry of water into the interior opening formed by the inside surfaces of the inner tube tube 2. An upper light housing 5 is secured to top disk 3, and is characterized by a light container 6 and a cooperating container lid 7, which is, in a preferred embodiment, threadably fitted to light container 6. As illustrated in phantom in FIG. 1, and more particularly in FIG. 2, an upper light bracket 9 is mounted to the top disk 3, and extends upwardly, supporting an upper light 10, located inside the upper light housing 5. Upper light wiring 11, also illustrated in phantom in FIG. 1, extends between positive and negative terminals of the upper light battery 13 to upper light 10, with one of the wires of upper light wiring 11 connecting an upper light switch 12 into the circuit in order to facilitate turning upper light 10 on and off. In a preferred embodiment of the invention upper light battery 13 is removably enclosed in a battery housing 14. In another preferred embodiment of the invention a reflector 15 is secured in angular relationship to the container lid 7, and container lid 7 is shaped of a transparent material such as a clear plastic, in order to facilitate reflection of light from the upper light 10 outwardly from the inner tube 2 in a desired area to permit observation of a cork or line positioned near the fish-attracting device 1, and conveniently take fish which are lured to the fish-attracting device while fishing at night.

Referring again to FIGS. 1 and 2, in a most preferred embodiment of the invention an elongated, hollow bait container support 16, is attached at one end to top disk 3 and bottom disk 4, and extends from bottom disk 4 to support a bait container 23 in submerged relationship beneath the water 31 and above the water bottom 32, of the water body floating the fish-attracting device 1. In another most preferred embodiment of the invention the bait container support 16 is attached to the container lid 17 of a lower light housing 17, which container lid 7 is in turn, threadibly connected to the light container 6, and the light container 6 further attached to the container top 29 of the bait container 23. In a still another most preferred embodiment of the invention the bait container 23 is shaped from a transparent material such as plastic, in the configuration of a box defined by container sides 24, container ends 25, a container top 29 and container bottom 28. Apertures 26 are provided in container sides 24 and container ends 25 to facilitate entry of water into the interior of base container 23, and facilitate live aquatic bait such as frogs, crawfish, shiners and the like placed in bait container 23 by means of the hatch 33 connected to the container top 29 by means of hatch hinge 34. The lower light bracket 18 extends from the wall of light container 6 and supports a lower light 19, which is provided with lower light wiring 20, extending from the lower light battery 22, as illustrated in FIG. 1. One of the wires in lower light wiring 20 extends from one of the terminals of lower light battery 22, through lower light switch 21 in order to facilitate turning lower light 19 on and off to illuminate the bait inside bait container 23. In yet another most preferred embodiment of the invention light container 6 is shaped from a transparent material such as clear plastic, in order to permit radiation of light from lower light housing 17, as well as into bait container 23, to further attract fish to the fish-attracting device 1.

Figure 4:
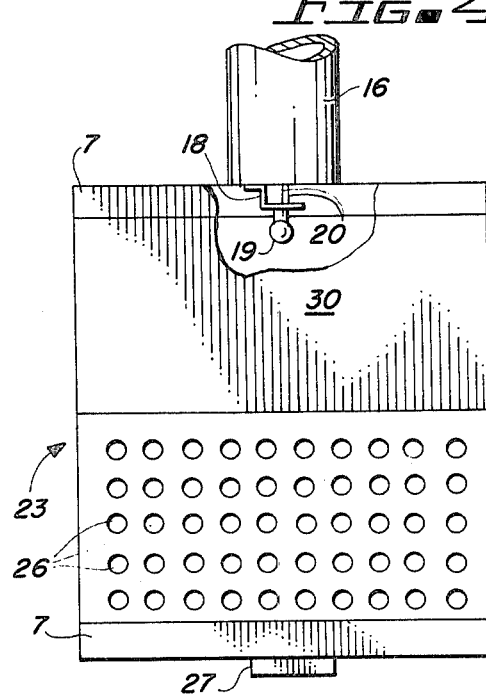
FIG. 4 is a side elevation, partially in section, of an alternative bait container for the fish-attracting device.

Referring now to FIG. 4 of the drawing in another preferred embodiment of the invention the bait container 23 is coupled to a sealed chamber 30, disposed above the bait container 23, which bait container 23 is provided with a container lid 7 at the bottom, and the lower light 19 extends from a container lid 7 into the sealed chamber 30. In a most preferred aspect of this embodiment of the invention the walls of sealed chamber 30 are transparent to better facilitate radiation of light from lower light 19 in all directions from sealed chamber 30; furthermore, the bait container 23 is also provided with transparent walls and with apertures 26, for reasons heretofore described, and the container lid 7 of sealed chamber 30 is attached to one end of the bait container support 16, as in the case of the bait container 23, illustrated in FIGS. 1 and 2. This feature enables different styles of bait containers to be quickly and easily coupled to the bait container support 16.

It will be appreciated from a consideration of the fish attracting device 1 of this invention that a variety of live bait can be utilized in the bait container 23 to attract fish. For example, as heretofore noted, live minnows, crawfish, frogs and other aquatic life can be placed inside bait container 23 by means of the hatch 33, and the bait container 23 submerged in the manner illustrated in FIG. 1, to attract the desired species of fish to the fish attracting device 1. By way of illustration, if it is desired to attract Bass or Crappie, minnows or (shiners) are a logical choice for use as bait inside the bait container 23. Furthermore, if Catfish are the desired fish, then an appropriate blood bait or other scent-type bait can be placed in the bait container 23 and particularly, in the bait container 23 illustrated in FIG. 4, in order to attract Catfish to the fish-attracting device 1. Bream can be attracted to the fish-attracting device by placing crickets or worms, in non-exclusive particular, in a sealed, transparent bait container 23, as desired. Other baits can be used with equal efficiency and effectiveness in attracting various types of fish to the fish-attracting device 1, accordingly to the knowledge of those skilled in the art.

It will be appreciated by those skilled in the art that the fish-attracting device of this invention can be easily used as a dual attraction feature during night fishing. Referring again to FIGURES FIGS. 1 and 2 of the drawing, the upper light 10 is positioned in close proximity to the reflector 15, which contains a mirror surface on the downwardly facing side, to project light outwardly and in a relatively concentrated, fan-shaped beam outwardly of the inner tube in order to facilitate easy observation of the cork of a fisherman fishing in the vicinity of the fish-attracting device 1. In a further preferred embodiment of the invention the light container 6 in upper light housing 5 is shaped of a transparent material such as clear plastic, to further permit radiation of light from upper light 10 in a 365° radius about inner tube 2, in order to better facilitate visual fishing in the vicinity of fish attacting device 1. Since the fish-attracting device 1 is, in a preferred embodiment, self-contained, in that the upper light battery 13 and lower light battery 22 supply power for the upper light 10 and the submerged lower light 19, respectively, there need be no lines or attachments or electrical wiring extending from the fish attracting device 1 to the boat, beach, bank or wharf, unless such a line is desirable in order to tether the fish attracting device 1 to the boat, beach, bank or wharf. Such wiring can be used if it is desired to use an upper light 10 and lower light 19 which are powered by 110 volts, as desired.

In another preferred embodiment of the invention a weight 27 is attached to the underside of the bait container 23 in order to stabilize the bait container 23 in submerged configuration as illustrated in FIG. 1. The size of the weight 27 will be dependent upon the buoyancy and size of the inner tube 2, as well as the size and buoyancy of of lower light housing 17. In yet another preferred embodiment of the invention the bait container support 16 is shaped from aluminum tubing, one end of which is attached to top disk 3 and bottom disk 4, as illustrated in FIGS. 1 and 2, and the opposite end of which is fixed to the container lid 7 of the lower light housing 17.

Having described my invention with the particularity set forth above, what is claimed is:

1. A fish-attracting device comprising:
   (a) an inflated inner-tube having an interior opening and further comprising an upper disk closing the top of said interior opening, and a lower disk closing the bottom of said interior opening for floating on a body of water containing fish;
   (b) first light means carried by said inner-tube above the water line for illuminating the surface of the water adjacent said inner-tube;
   (c) bait-containing means carried by said inner-tube and submerged in the water below said inner-tube when said fish-attracting device is placed in the body of water; and
   (d) second light means cooperating with said bait-containing means to illuminate said bait-containing means when said bait-containing means is submerged in the water.

2. The fish-attracting device of claim 1 wherein said first light means is a first light container mounted on said inner-tube; a first light bulb in said first light container; and a first switch in electrical cooperation with said first light bulb and a source electric current.

3. The fish-attracting device of claim 1 wherein said bait-containing means is a transparent vessel and further comprising a support having one end attached to said inner-tube and the opposite end of said support attached to said bait-containing means for suspending said bait-containing means beneath said inner-tube.

4. The fish-attracting device of claim 1 wherein said first light means is a first light container secured to said upper disk, a first light bulb in said first-light container and a switch in electrical cooperation with said first light bulb and a source of electric current.

5. The fish-attracting device of claim 1 wherein said second light means is a second light container mounted on said bait-containing means, a second light bulb in said second light container and a second switch in electrical cooperation with said second light bulb and a source of electric current.

6. The fish-attracting device of claim 1 wherein:
   (a) said bait-containing means is a transparent vessel, a plurality of apertures communicating with the interior of said vessel and an access hatch in said vessel, and further comprising an elongated, hollow support having one end attached to said upper disk and said lower disk, and the opposite end of said support attached to said transparent vessel for suspending said transparent vessel beneath said inner-tube;
   (b) said first light means is a first light container secured to said upper disk, a first light bulb in said first light container and a switch in electrical cooperation with said first light bulb and a first source of electric current; and (c) said second light means is a sealed second light container having a detachable lid attached to said elongated support, a second light bulb in said sealed second light container and a second switch in electrical cooperation with said second light bulb and a second source of electric current.

7. The fish-attracting device of claim 6 wherein said first source of electric current is a first battery and said second source of electric current is a second battery.

8. The fish-scattering device of claim 1 wherein said bait-containing means has a transparent, sealed vessel, and further comprising an elongated, hollow support having one end attached to said inner-tube and the opposite end of said support attached to said sealed vessel for suspending said sealed vessel beneath said inner-tube.

9. The fish-attracting device of claim 8 further comprising a companion vessel carried by said sealed vessel, at least one aperture and an access hatch in said companion vessel.

10. The fish-attracting device of claim 8 wherein said second light means is positioned inside said sealed vessel and said at least one aperture is a plurality of apertures.

* * * * *